Patented Nov. 4, 1952

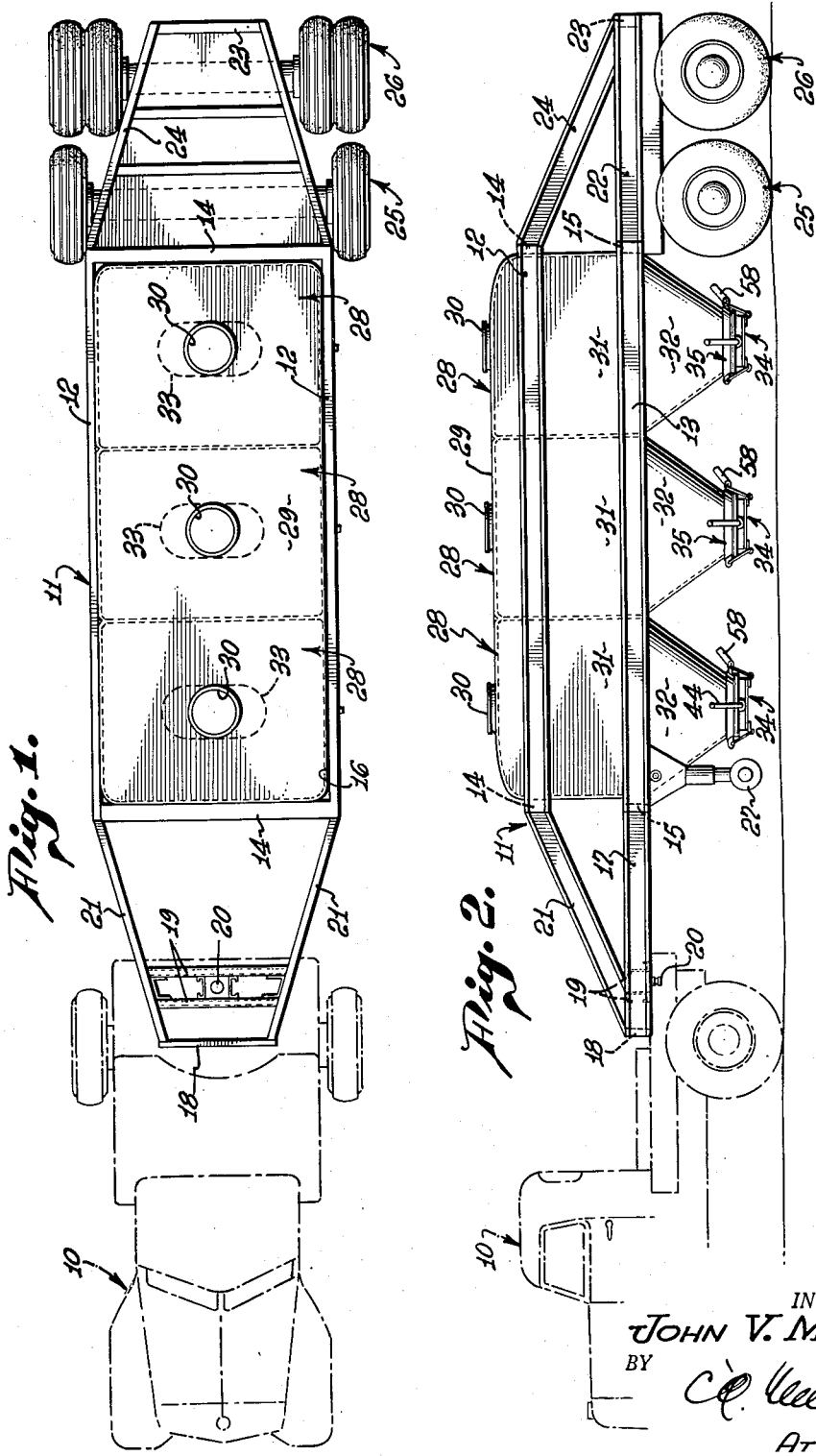

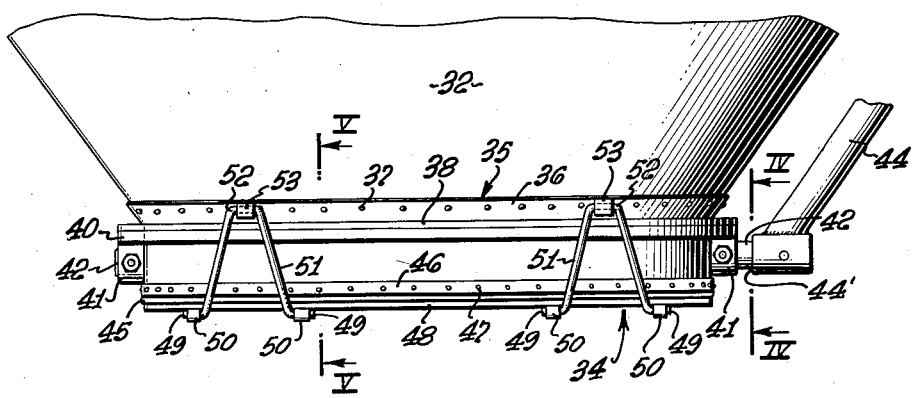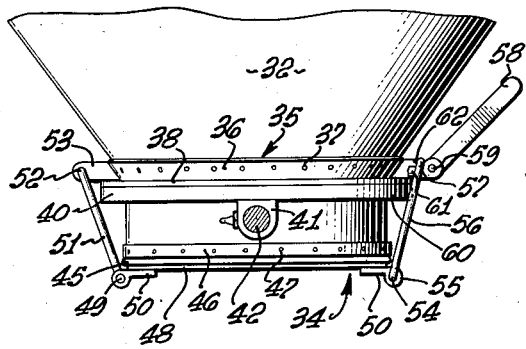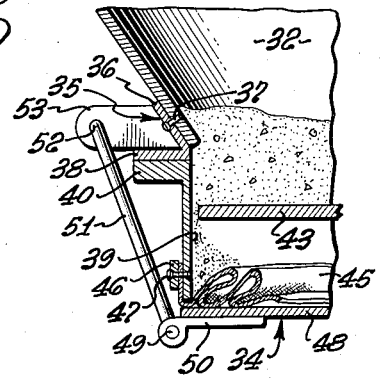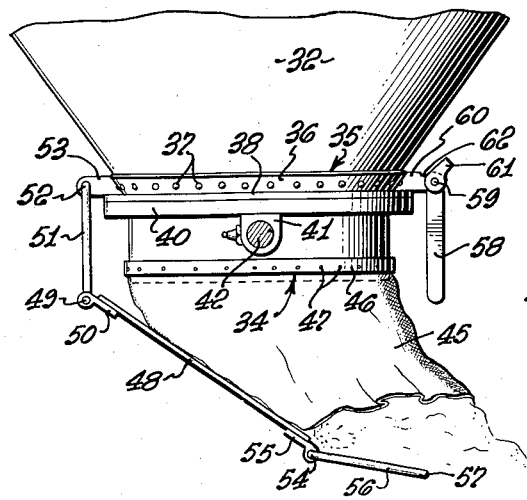

2,616,758

UNITED STATES PATENT OFFICE 2,616,758

VEHICLE CONSTRUCTION FOR HAULING BULK MATERIAL

John V. Meyers, San Dimas, Calif., assignor, by mesne assignments, to Brogdex Company, Pomona, Calif., a corporation of California Application June 6, 1949, Serial No. 97,374

21 Claims. (Cl. 298—30)

This invention relates to a vehicle body construction and particularly to a truck or trailer body construction adapted for bulk hauling of powdered or finely divided material such as bulk cement having a relatively high angle of repose.

The present construction of cement trucks includes a truck frame having a series of containers or hoppers mounted on the frame for storage of bulk cement during transit. The hoppers usually have a centrally disposed bottom outlet port spaced relatively high above the ground surface to facilitate unloading of the cement. The flow of the cement therethrough is controlled or sealed off by a square, flap valve of such a design that it is quite difficult to prevent some leakage of cement therethrough when the valve is in closed position. Each hopper includes a funnel-shaped portion extending upwardly and flaring outwardly from the outlet port at an angle which is usually slightly greater than the angle of repose of the material carried so that gravitational flow of material through the port is afforded. Because the angle of repose of cement is relatively great, the funnel-shaped portion of the hopper is relatively high, and the upper portion of the hopper which is defined by vertical walls, is usually relatively shallow as compared to the height of the funnel-shaped portion. Obviously this construction places a definite limit on the quantity or volume of cement carried because an extension of the vertical walls upwardly or enlargement of the top portion of the hopper will cause the center of gravity of the material to move upwardly to a point so high that the cement truck will become top-heavy when loaded. A dangerous and undesirable condition is thereby created.

The primary object of this invention is to design a cement carrying truck or trailer wherein the above disadvantages are obviated and wherein a greater quantity of cement or similar bulk material may be carried while maintaining a relatively low center of gravity of the material.

Another object of this invention is to provide a vehicle body construction having a series of material carrying hoppers thereon, each of which is provided with a novel bottom outlet valve assembly which affords positive sealing of the material and facilitates handling of said material when discharged.

Still another object of this invention is to provide a cement carrying vehicle construction as above described permitting a low center of gravity while at the same time providing for gravitational flow of the material during unloading.

A further object of this invention is to design a novel bottom outlet valve assembly which permits handling of the discharged material therethrough from a bottom outlet which is spaced a relatively short distance above the ground surface.

This invention also contemplates a novel valve assembly for a bottom outlet port of a hopper such as described above whereby protection is afforded to the closed valve from moisture which may be thrown up against the under side of the vehicle body by the wheels when the truck is traveling over a wet pavement.

An important object of this invention is to provide and design a hopper construction for such a cement carrying truck whereby the lower funnel-shaped portion of the hopper has a relatively shallow construction while maintaining the necessary inclination of the walls thereof to permit gravitational discharge of material and a relatively large portion defined by vertical walls in which the greater proportion of the cement may be carried.

Other objects and advantages of this invention will be readily apparent from the following description of the drawings.

In the drawings:

Fig. 1 is a top plan view of a tractor and trailer embodying the vehicle body construction contemplated by this invention.

Fig. 2 is a side view of Fig. 1.

Fig. 3 is a fragmentary enlarged view of the bottom portion of one of the hoppers showing the novel valve arrangement, the view being taken from a plane transverse to the axis of the vehicle.

Fig. 4 is a fragmentary, enlarged side view of the valve assembly shown in Fig. 3 and taken from the plane indicated by line IV—IV of Fig. 3.

Fig. 5 is an enlarged sectional view of the valve assembly taken in a plane indicated by the line V—V of Fig. 3.

Fig. 6 is a view of the valve assembly in position for discharge of the cement therethrough.

Referring particularly to Figs. 1 and 2 the tractor-trailer combination illustrated includes a tractor generally indicated at 10 of any well-known make providing a prime mover for the trailer generally indicated at 11. The tractor and trailer may be connected in any suitable usual manner as by a fifth wheel connection, the details of which are not shown.

The trailer 11 embodying the novel vehicle construction for transporting in bulk, finely divided or powdered material such as cement having a relatively high angle of repose may comprise a vehicle frame or chassis including top and bottom spaced side frame members 12 and 13 respectively joined at their ends by top and bottom spaced transverse frame members 14 and 15 respectively, the said transverse members defining with the side members an elongated rectangular opening 16 having its long axis aligned with the longitudinal axis of the trailer. Inwardly converging forwardly directed diagonal members 17 joined with the bottom side members are connected at their forward ends by a transverse member 18. Intermediate the ends of diagonal members 17 may be provided spaced transverse members 19 supporting at the longitudinal axis of the trailer a king post or pin 20 providing a connection to a fifth wheel (not shown) carried by the tractor. Downwardly directed and inwardly converging members 21 join the top side members with the diagonal members 17 at the transverse member 18.

The rear portion of the trailer is provided with a somewhat similar frame structure including inwardly converging diagonal bottom members 22 joined rearwardly by a transverse member 23. The top side members 12 may be connected to diagonal members 22 by downwardly directed and inwardly converging members 24.

The trailer frame may be supported rearwardly by a pair of longitudinally spaced wheel and axle assemblies 25 and 26. Assembly 25 may comprise a single set of wheels and assembly 26 is illustrated as having a dual set of wheels on each side of the trailer frame. Rearwardly of the fifth wheel connection at king post 20 may be provided an extensible and collapsible trailer supporting wheel assembly 27 which may be lowered to support the trailer when it is desired to disconnect the tractor.

Material-carrying receptacles or hoppers 28 may be supported from the frame structure within the elongated rectangular opening 16 in a series or tandem arrangement. Hoppers 28 may be secured to the top and bottom side members and the front and rear transverse members defining the rectangular opening 16 by any suitable means such as nut and bolt assemblies or by welding. It should be noted that securing of hoppers 28 to the top and bottom side frame members 12 and 13 at each side of the truck frame provides a side frame truss of skin type wherein the side walls of the hoppers connect the members 12 and 13. The hoppers 28 may be made of any suitable material preferably a lightweight wear resistant metal such as aluminum alloy in order to substantially reduce the weight of the hopper construction.

Each hopper 28 comprises a top horizontal wall 29 having a circular centrally disposed opening or manhole 30 for providing means for filling the hopper with material to be carried. Manhole 30 may be provided with a suitable cover plate secured in any well-known manner.

Each hopper 28 includes a top rectangular box-like deep portion 31 having vertical side, front and rear walls defining a relatively large material-holding compartment as compared to the capacity of a congruous lower funnel-shaped portion 32. It may be noted that the side walls of the top portion 31 have a slightly less length than the front and rear walls, the front and rear walls extending between the side members of the trailer frame.

The lower shallow portion 32 comprises diagonally inwardly directed side walls and front and rear walls terminating at a point slightly below the plane of the axles of the wheel and axle assemblies in margins defining an elongated somewhat elliptical bottom outlet port 33 having its long axis transverse to the trailer. The inclination of the walls defining the lower funnel-shaped portion 32 are equal to or slightly greater than the angle of repose of the material being carried. For example, if cement is carried in hoppers 28, inclination of the diagonal walls will be about 58° or slightly greater in order that the material may be discharged from the hopper by gravitational flow since the angle of repose of bulk cement is approximately 58°.

The elliptical shape of the bottom outlet port 33 takes such form because of the difference in length between the transverse front and rear walls of the hopper and the side walls thereof. By this construction there is provided a hopper which has a lower funnel-shaped portion 32 of relatively shallow construction as compared to the upper portion 31 which has relatively high vertical walls. It will be apparent that the center of gravity of material carried in a hopper 28 will be between the top and bottom side members and thus a topheavy construction is obviated.

A novel valve assembly is provided for each of the bottom outlet ports 33 on the hoppers 28. This assembly generally indicated at 34 may be mounted on a hopper by adapter means 35 of angular cross-section and conforming to the configuration of port 33. The adapter means 35 has a lip 36 disposed at virtually the same angle as the inclined walls of the lower portion 32 for securing against outer marginal surfaces of the inclined walls adjacent port 33 by a plurality of spaced rivets 37. The lip 36 is integrally joined with a horizontally disposed flange 38 for supporting the valve assembly.

The valve assembly includes a valve throat member 39 of the same elongated configuration as the discharge port 33, said throat member having a horizontal flange 40 co-extensive with the horizontal flange 38 on the adapter means 35. The flanges 38 and 40 may be secured together by means of a plurality of spaced nut and bolt assemblies (not shown) extending through said flanges.

The throat member 39 may be provided with external trunnions 41 disposed at opposite ends of its long axis, said long axis being transverse to the longitudinal axis of the trailer body. The trunnions 41 afford journals for ends of valve shaft 42, said shaft supporting intermediate its ends and within the confines of the throat member an elliptical valve plate 43. The plate 43 is rigidly fixed to valve shaft 42 and is provided loose tolerance with the inner surfaces of the throat member so that it may be readily rotated about the shaft axis thus affording a butterfly type of valve.

The valve plate 43 is manually operable by a diagonally upwardly extending handle 44 secured in any convenient manner to an end of shaft 42 projecting outwardly from a trunnion 41 as indicated at 44' in Fig. 3. Since the shaft axis is transverse to the longitudinal axis of the trailer the valve operating handles 44 may be conveniently reached and operated by an operator standing at the side of the trailer.

Means for sealing and for handling discharge of the cement through the valve assembly is provided by a relatively long tubular boot or duct 45 of flexible compliant fabric material such as canvas. As best indicated in Fig. 5 the upper open end of duct 45 is sleeved over the lower margins of the throat member 39 and secured against the outer peripheral surfaces of the throat member by a metallic band 46 encircling the upper end of the duct and capable of being drawn snug and tight against the throat member 39. The band may then be secured by a plurality of spaced peripheral rivets 47 which extend through the band, the upper margins of the duct 45, and the throat member 39. The duct 45 may be made of any suitable length sufficient to carry the discharge of material therethrough to a point adjacent the side of the hopper where the other open end of the duct may be conveniently handled for directing the discharge of the cement into bags or into any other type of material-storing system. The duct may be provided with a uniform elliptical cross-section throughout its length or if desired the duct may be provided with a cross-section adjacent its discharge end which is circular or smaller than the cross-section of the elliptical port.

Means are operatively associated with the duct and throat member for removably holding the duct in folded position within the throat member beneath the valve plate 43 when it is desired to seal the discharge port 33. For this purpose a holding plate 48 is provided having an elliptical shape of slightly greater outer dimensions than the elliptical shape of the throat member 39. Plate 48 is pivotally supported at 49 at one side by spaced hinges 50 and generally inverted V-shaped links 51, each V-shaped link 51 being pivotally supported at 52 from a supporting bracket 53 secured to the adapter means 35.

At its opposite side plate 48 may be pivotally connected at 54 through hinges 55 to similar spaced inverted V-shaped links 56 having their closed ends 57 adapted to be slipped over release handles 58. Each release handle 58 is pivotally mounted at 59 to a bracket 60 supported from the adapter means, said release handle 58 having a short projecting arm 61 extending beyond the pivotal connection 59 at an angle to the axis of the handle 58. When link 56 is passed over the handle 58 upward motion of the handle will cause the closed end of the link to move over pivotal connection 59 and into an accommodating positioning notch 62 on bracket 60 for securing the link when plate 48 is drawn snugly against the bottom of the throat member. When handle 58 is in its upper secured position as in Fig. 4, safety plate 48 is in a substantially horizontal position beneath the opening in the throat member 39. As best seen in Fig. 5 sufficient space is allowed between the lower peripheral edge of the throat member and the upper surface of plate 48 to permit passage therebetween of the fabric of duct 45 without pinching or pressing the material of the fabric. The weight of the plate when the hoppers are empty is sufficient to hold and lock the upper closed end 57 of the link 56 in the notch 62. The weight of the plate thus holds the handle 58 in its diagonally upwardly closed position by bearing against the angularly disposed arm 61. When the hoppers are loaded it will be readily seen that the weight of the plate together with the weight of material which may seep between the edges of the valve plate 43 and the throat member will hold the plate and links 56 in closed position.

When the hopper is filled with material, such as cement, and it is desired to unload said material through the outlet port 33 and valve assembly 34, each release handle 58 may be turned downwardly to cause link 56 to move out of notch 62 over the pivotal connection 59 and downwardly to the ground surface. Since the plate is pivotally hung from the adapter means it may be readily pulled outwardly from beneath the discharge port to provide free working space beneath the hopper. As the plate 48 is moved from beneath the discharge port the duct 45 which has been folded between the plate and the valve plate 43 within the throat member will fall downwardly and its lower open end may be guided to a proper position for bag filling or for transfer of the cement to a cement-storing system. The valve plate 43 may be readily turned to open position by manipulation of the operating handle 44 in either direction so that valve plate 43 is in a vertical position.

When it is desired to close the discharge port 33 valve plate 43 may be turned to horizontal position by the operating handle 44. The duct 45 may be shaken to eliminate any material retained therein from the discharge operation and then folded or stuffed into the space within the throat member beneath the valve plate as the holding plate 48 is drawn into closed position. Plate 48 is secured in the manner described above by passing links 56 over handles 58 and turning handles 58 into a diagonally upright position. In closed position it will be noted that any seepage or leakage of cement around the edges of the valve plate will be contained within the space between the butterfly valve plate 43 and the holding plate 48 because fabric of the duct acts as a seal for preventing passage of material between the lower peripheral edges of the throat member and plate 48. The material accumulated and retained on holding plate 48 below the valve plate serves to limit accidental opening of the valve plate 43 to only a partial opening because rotation of the valve plate 43 is hindered. It should also be noted that in the example shown the holding plate 48 is spaced in proximity to the valve plate so that full opening of the valve plate is prevented thereby.

In addition to affording a holding means for duct 45 when the duct acts as a sealing means, the plate 48 also serves to prevent damage to the valve assembly which might be caused by rocks or gravel thrown upwardly against the valve assembly by the wheels. It also acts as a shield or guard to prevent moisture from entering the valve throat member which might cause difficulty in operation of the butterfly valve because of setting of the cement around the edges of the valve plate 43.

While the discharge port 33 has been illustrated as being elliptical in form, it will be readily understood by those skilled in the art that the discharge port may take any desired polygonal, circular, elliptical form, and the valve assembly may be modified to conform with the desired shape of the discharge port. While a single valve plate has been illustrated, obviously any suitable valve means may be employed within the throat member.

An elongated shape of the discharge port 33 is preferable because it permits construction of a hopper on a truck or trailer frame which is capable of carrying a large quantity of cement while at the same time having a relatively low center of gravity. Since the long axis of an elongated discharge port is transverse to the longitudinal axis of the trailer the lower funnel-shaped portion of the hoppers may be designed so that they have a relatively shallow depth as compared to the rectangular compartment defined by the upper vertical walls of the hopper while at the same time the inclination of the funnel-shaped portion will be great enough to permit discharge of the material carried by gravitational flow.

It will be readily understood by those skilled in the art that a novel design of a material-carrying hopper has been provided which is particularly suitable for mounting on trucks or trailers where there is a definite limitation on permissible height of the position of the center of gravity of the material carried in order to prevent top-heaviness and a trailer difficult to maneuver. The novel valve assembly disclosed in connection with the hopper design is positive in operation for sealing finely powdered material and yet is simple and easy to operate for discharge of the material when desired. It should be noted that the duct of flexible, compliant material not only affords a positive seal for the valve assembly but also acts as a convenient guide or chute for the material when it is discharged.

It will be readily understood that the embodiment of the invention disclosed above is exemplary only and that other modifications and changes may be made and are intended to be included within the scope of the appending claims.

I claim:

1. In a vehicle of low center of gravity for transporting loose, granular and finely divided flowable materials, including a longitudinally extending frame, the combination of: a plurality of material-holding receptacles carried in alignment on said frame, each receptacle comprising a main upper portion extending above the level of the frame and a lower portion having side walls inclined downwardly and inwardly to an elongated port extending in a direction transverse to the frame; and a valve assembly carried by each port, said assembly including a flexible, compliant duct which in extended form is adapted to direct the discharge of material through said port and in collapsed and folded form extends across the port as a barrier, and a plate having an area larger than said port selectively latchable over the port and collapsed duct to seal the port.

2. A vehicle of the character stated in claim 1, wherein the lower portion of each receptacle is below the level of the frame and the side walls of each such lower portion are at an angle greater than the angle of repose of the loose material held by the receptacle.

3. A vehicle of the character stated in claim 1, wherein each valve assembly includes a collar extending around the port and the sealing plate is hingedly connected to said collar.

4. A vehicle body construction for transporting bulk material at a low center of gravity comprising: a truck frame provided with an elongated, rectangular opening; a plurality of material-holding receptacles arranged in tandem in said opening and supported from the frame, each receptacle having an upper deep portion defined by vertical side and transverse end walls and a lower shallow portion defined by downwardly and inwardly inclined walls, the angle of said inclined walls being at least greater than the angle of repose of the bulk material carried; an elongated discharge port for each receptacle formed by terminal margins of the inclined walls; the longitudinal axis of said port being transverse to the longitudinal axis of the frame, and a valve assembly for each port, said assembly including a flexible compliant tube of material adapted for discharging the bulk material therethrough and for acting as a seal for the valve assembly when closed.

5. A vehicle body construction for transporting bulk material at a low center of gravity, comprising: a truck frame provided with an elongated, rectangular opening; a plurality of material-holding receptacles arranged in tandem in said opening and supported from the frame, each receptacle having an upper deep portion defined by vertical side and transverse end walls and a lower shallow portion defined by downwardly and inwardly inclined walls, the side walls having a length less than the length of the transverse end walls, the angle of said inclined walls being at least equal to the angle of repose of the bulk material carried; an elongated discharge port for each receptacle formed by terminal margins of the inclined walls, the longitudinal axis of said port being transverse to the longitudinal axis of the frame; and a valve assembly for each port, said assembly including a flexible, compliant tube of material adapted for discharging the bulk material therethrough and for acting as a seal for the valve assembly when closed.

6. A vehicle body construction for transporting bulk material at a low center of gravity, comprising: a truck frame provided with an elongated, rectangular opening; a plurality of material-holding receptacles arranged in tandem in said opening and supported from the frame, each receptacle having an upper deep portion defined by vertical side and transverse end walls and a lower shallow portion defined by downwardly and inwardly inclined walls, the angle of said inclined walls being at least greater than the angle of repose of the bulk material carried; an elongated discharge port for each receptacle formed by terminal margins of the inclined walls; and a valve assembly for each port, said assembly including a flexible, compliant tube of material adapted for discharging the bulk material therethrough and for acting as a seal for the valve assembly when closed.

7. A vehicle body construction for transporting bulk material, comprising: a truck frame including vertically spaced side frame members and provided with an elongated opening; a plurality of material-holding receptacles with their long axes transverse to the frame arranged in tandem in said opening and supported from the frame, each receptacle having an upper deep portion defined by vertical side and transverse end walls, lower margins of said vertical side walls terminating at and connected to the lowermost side frame members, and a lower shallow portion defined by downwardly and inwardly inclined walls, said inclined walls having upper margins terminating at the lowermost side frame members; a transversely elongated discharge port for each receptacle formed by lower terminal margins of the inclined walls; and a valve assembly for each port, said assembly including a flexible compliant tube of material adapted for discharging the bulk material therethrough and for acting as a seal for the valve assembly when closed.

8. In a valve means for a vehicle for transporting loose, flowable bulk materials, said vehicle including a longitudinally extending frame supporting a series of material-holding receptacles, each having an outlet port for gravitational flow of material therethrough, the provision of: a valve assembly, comprising a valve-throat member extending around said port; a valve plate within said member pivotally mounted for controlling flow of material through said member; a flexible, compliant duct having one open end sleeved over outer marginal surfaces of one end of the throat member for securement thereto, said duct being collapsible within said throat member beneath said valve plate; and holding means for retaining said duct in collapsed position within the throat member, said holding means including a plate having an area larger than said port removably positioned across the discharge end of the valve assembly.

9. In a valve means of a vehicle for transporting loose, flowable bulk materials, said vehicle including a longitudinally extending frame supporting a series of material-holding receptacles, each having an outlet port for gravitational flow of material therethrough, the provision of: a valve assembly comprising a valve-throat member extending around said port; a valve plate within said member pivotally mounted for controlling flow of material through said member; a flexible, compliant duct having one open end sleeved over outer marginal surfaces of one end of the throat member for securement thereto, said duct being collapsible within said throat member beneath said valve plate; and holding means for retaining said duct in collapsed position within the throat member, said holding means including a protective plate hingedly mounted for moving into a position across the open end of the throat member.

10. In a valve means for a vehicle for transporting loose, flowable bulk materials, said vehicle including a longitudinally extending frame supporting a series of material-holding receptacles, each having an outlet port for gravitational flow of material therethrough, the provision of: a valve assembly comprising a valve-throat member extending around said port; a valve plate within said member pivotally mounted for controlling flow of material through said member; a flexible, compliant duct having one open end sleeved over outer marginal surfaces of one end of the throat-member for securement thereto, said duct being collapsible within said throat member beneath said valve plate; and holding means for retaining said duct in collapsed position within the throat member.

11. In a vehicle for transporting loose granular and finely divided flowable materials, the combination of: a frame supported on wheel and axle assemblies, said frame including lower side members and upper side members joined to said lower side members by diagonal members, said lower side members lying in a plane spaced slightly above said wheel and axle assemblies; a plurality of adjacent material holding receptacles supported by the frame in tandem arrangement, each receptacle having a top portion defined by vertical side and transverse end walls extending upwardly from the lower side members of the frame, said side walls forming with adjacent upper and lower side members side frame trusses; and a bottom portion defined by converging walls extending below the lower side members to a plane slightly below the plane of the axis of the wheel and axle assemblies; a transversely elongated discharge port formed by the terminal margins of the converging walls, said converging walls being inclined at an angle at least greater than the angle of repose of the material to be carried by the receptacle, the lower portion of the receptacle having a depth less than the depth of the top portion.

12. In a vehicle for transporting loose granular and finely divided flowable materials, the combination of: a frame supported on wheel and axle assemblies, said frame including lower side members and upper side members joined to said lower side members by diagonal members, said lower side members lying in a plane spaced slightly above said wheel and axle assemblies; a plurality of adjacent material holding receptacles supported by the frame in tandem arrangement, each receptacle having a top portion defined by vertical side and transverse end walls extending upwardly from the lower side members of the frame, said side walls forming with adjacent upper and lower side members side frame trusses, and a bottom portion defined by converging walls extending below the lower side members to a plane slightly below the plane of the axis of the wheel and axle assemblies; and a valved outlet at the lowermost portion of the bottom portion, said valved outlet including a flexible compliant tube of material adapted for discharging the bulk material therethrough and for acting as a seal for the outlet when closed.

13. In a body construction for transporting a large mass of bulk material while maintaining low center of gravity of the mass, the combination of: a frame structure supported by wheel and axle assemblies and including side frame members lying in a plane slightly above the wheels of said assemblies; and means for holding the bulk material including a receptacle of elongated plan with its longitudinal axis transverse to the frame structure, said receptacle including a top portion with vertical walls having bottom margins lying virtually in the plane of said side frame members and extending upwardly therefrom and a bottom portion with converging walls having upper margins lying virtually in the plane of the side frame members and extending downwardly therefrom and terminating in a discharge port lying in a plane below the plane of the axis of the wheel and axle assemblies, the converging walls being disposed at an angle slightly greater than the angle of repose of the bulk material to be transported.

14. In a body construction for transporting a large mass of bulk material while maintaining low center of gravity of the mass, the combination of: a frame structure supported by wheel and axle assemblies and including parallel side frame members lying in a vertical plane, the lowermost members being slightly above the wheels of said assemblies; and means for holding the bulk material including a receptacle of elongated plan with its longitudinal axis transverse to the frame and supported by the frame, said receptacle including a top portion with vertical walls extending between and upwardly from the frame members and forming therewith skin type side frame trusses and a bottom portion with converging walls extending downwardly from the frame members and terminating in a discharge port lying in a plane below the plane of the axis of the wheel and axle assemblies.

15. In a body construction for transporting bulk material at a low center of gravity, the combination of: a frame structure provided with a rectangular opening and supported by wheel and axle assemblies; a plurality of material holding receptacles supported by the frame in the opening, each receptacle having a lower shallow portion extending downwardly from lowermost side members of the truck frame and defined by converging walls and an upper deep portion defined by vertical walls extending upwardly from the lowermost members of the frame and forming with vertically spaced side members of the frame a side frame truss; and a discharge port formed by the lower margins of the converging walls and lying in a plane below the axis of the wheel and axle assemblies; and a valve assembly for said port, said assembly including a flexible compliant tube of material adapted for discharging the bulk material therethrough and for acting as a seal for the valve assembly when closed.

16. In a body construction for transporting bulk material at a low center of gravity, the combination of: a frame structure provided with a rectangular opening and supported by wheel and axle assemblies; a plurality of transversely elongated material holding receptacles having a lower shallow portion defined by converging walls having upper margins lying virtually in the plane of lowermost side members of the frame structure and extending downwardly therefrom and an upper deep portion defined by vertical walls having bottom margins lying virtually in the plane of the lowermost side members and extending upwardly therefrom; and a valved outlet at the lowermost portion of the shallow portion and lying in a plane below the axis of the wheel and axle assemblies, said valved outlet including a tube adapted for discharging the bulk material therethrough and for acting as a seal for the valved outlet when closed.

17. A valve assembly for controlling discharge of loose granular flowable materials from a port including: a valve throat member communicating with the port; valve means pivoted in the throat member; an open-ended flexible duct having one end connected in flow-tight relation to the throat member, the remainder of the duct being collapsible; and means extending across the lower end of the throat member for supporting the duct in collapsed position below the valve means, said retaining means including a pivoted plate underlying marginal edges of the throat member.

18. A valve assembly for controlling discharge of loose granular flowable materials from a port including: a valve throat member communicating with the port; valve means pivoted in the throat member; an open-ended flexible duct having one end connected in flow-tight relation to the throat member, the remainder of the duct being collapsible; and means extending across the lower end of the throat member for retaining the duct in collapsed position below the valve means.

19. In a vehicle for transporting loose granular and finely divided flowable materials while maintaining low center of gravity of said materials, including a longitudinally extending frame, the combination of: a plurality of material holding receptacles carried in alignment on said frame, each receptacle comprising a main upper portion extending above the level of the frame and a lower portion having side walls inclined downwardly and inwardly to a discharge port; and a valve assembly carried by each port, said assembly including a flexible compliant duct which in extended form is adapted to direct the discharge of material through said port and in collapsed and folded form extends across the port as a barrier, and a plate having an area larger than said port selectively latchable to cover the port and to support the collapsed duct for sealing the port.

20. In a valve means for a vehicle for transporting loose flowable bulk materials, said vehicle including a longitudinally extending frame supporting a series of material holding receptacles each having an outlet port for gravitational flow of material therethrough, the provision of: a valve assembly comprising a valve throat member extending around said port; valve means within said member pivotally mounted for controlling flow of material through said member; a flexible compliant duct having one open end and connected in flow-tight relation to the throat member, said duct being collapsible beneath said valve means; and holding means for retaining said duct in collapsible position for sealing said port.

21. A valve assembly for controlling discharge of loose, granular, flowable materials from throat means defining a discharge port including: valve means pivoted in the throat means; an open ended flexible duct having one end connected in flow tight relation to the throat means, the remainder of the duct being collapsible; and means extending across the lower end of the throat means for retaining the duct in collapsed position before the valve means.

JOHN V. MEYERS.

REFERENCES CITED

The following references are of record in the file of this patent:

UNITED STATES PATENTS

| Number | Name | Date |
| --- | --- | --- |
| 703,276 | Kellogg | June 24, 1902 |
| 1,263,760 | Harvey et al. | Apr. 23, 1918 |
| 1,368,886 | Bradley | Feb. 15, 1921 |
| 1,644,521 | Hamm | Oct. 4, 1927 |
| 1,822,530 | Kind | Sept. 8, 1931 |
| 2,051,984 | Cartzdafner | Aug. 25, 1936 |
| 2,150,624 | Johnson | Mar. 14, 1939 |
| 2,163,061 | Riblet | June 20, 1939 |
| 2,171,030 | Gibson | Aug. 29, 1939 |
| 2,250,262 | Hill | July 22, 1941 |
| 2,310,251 | Mashon | Feb. 9, 1943 |